No. 816,844. PATENTED APR. 3, 1906.
F. BROOK.
EMPLOYEE'S TIME RECORDER.
APPLICATION FILED APR. 13, 1905.
3 SHEETS—SHEET 1.
fig. 1.
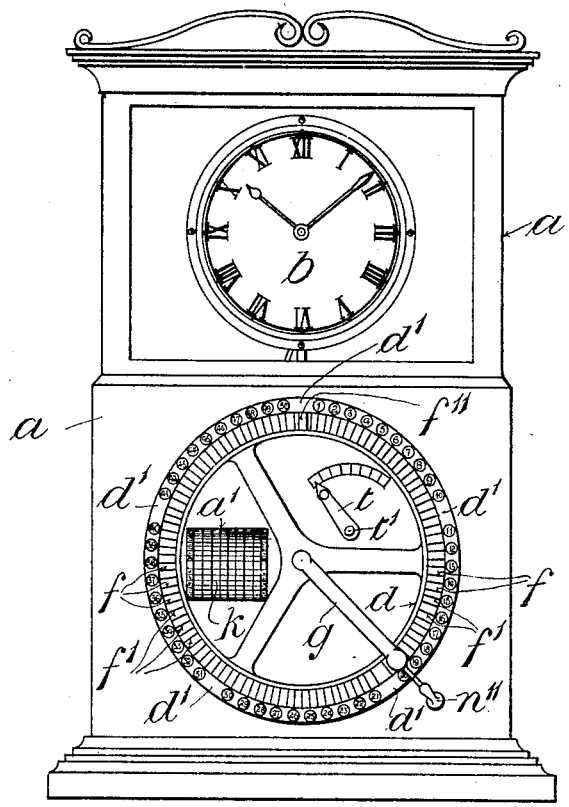
fig. 9.
fig. 10.
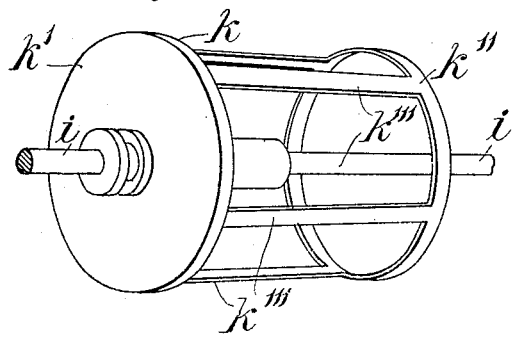
Witnesses.
T. L. Nelson.
M. Olean.
Inventor.
Frank Brook,
by John E. Dewey
Attorney No. 816,844. PATENTED APR. 3, 1906.
F. BROOK.
EMPLOYEE'S TIME RECORDER.
APPLICATION FILED APR 13, 1905.
3 SHEETS—SHEET 2.
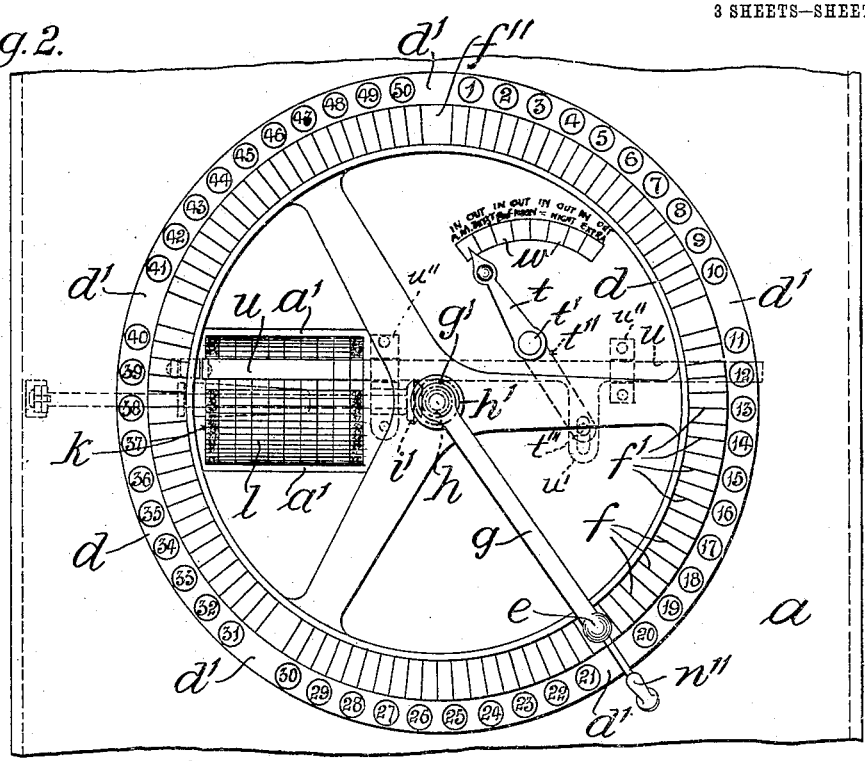
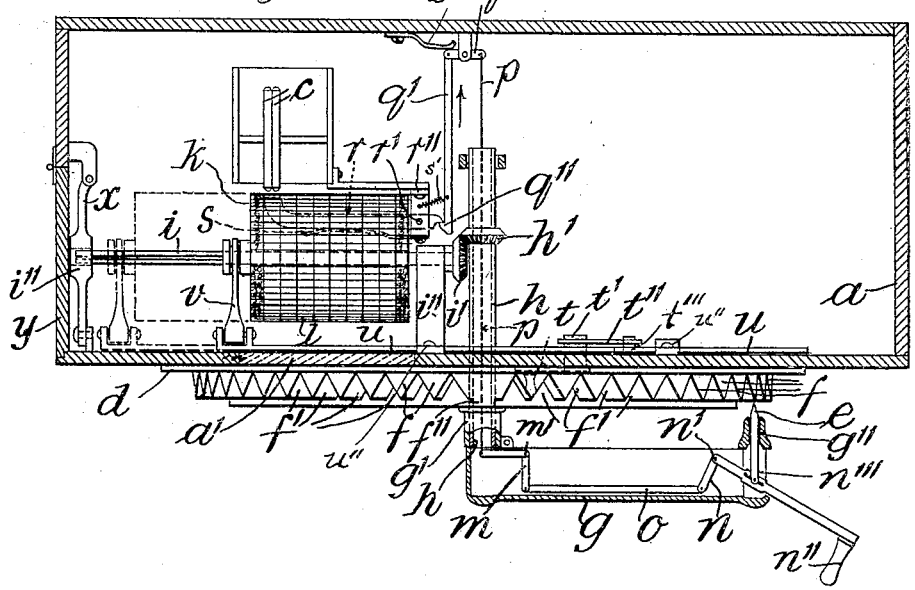

No. 816,844. PATENTED APR. 3, 1906.
F. BROOK.
EMPLOYEE'S TIME RECORDER.
APPLICATION FILED APR 13, 1905.
3 SHEETS—SHEET 3.
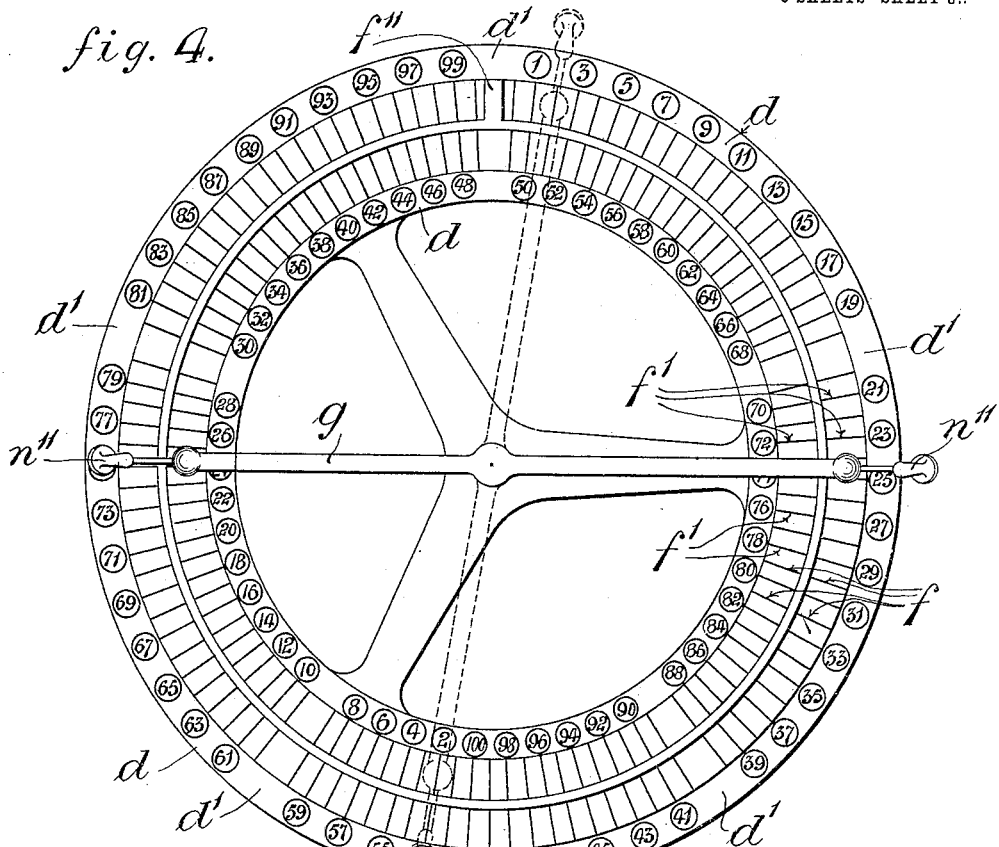
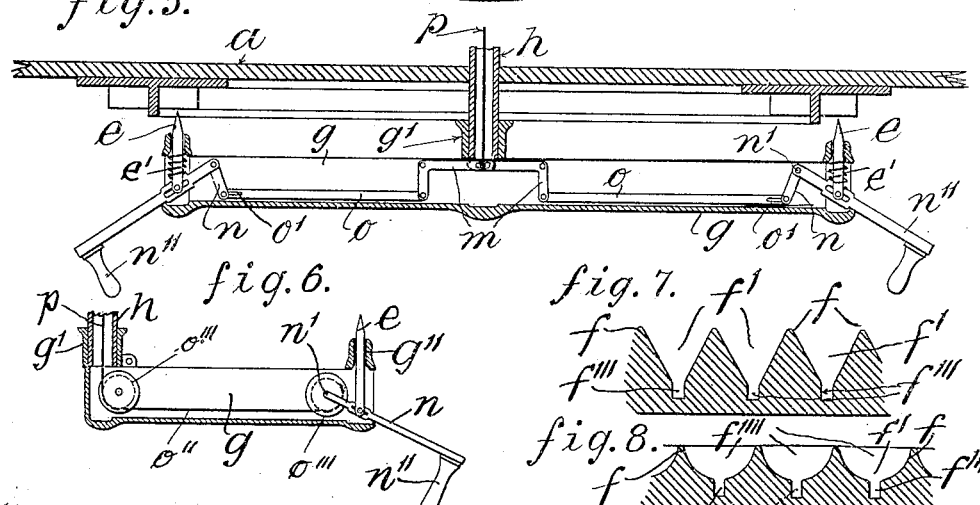
Witnesses.
T. T. Nelson
M. Haas
Inventor.
Frank Brook.
by John C. Dewey,
Attorney.

UNITED STATES PATENT OFFICE.

FRANK BROOK, OF HUDDERSFIELD, ENGLAND.

EMPLOYEE'S TIME-RECORDER.

No. 816,844.          Specification of Letters Patent.          Patented April 3, 1906.

Application filed April 13, 1905. Serial No. 255,284.

*To all whom it may concern:*

Be it known that I, FRANK BROOK, a subject of King Edward VII of Great Britain, residing at Huddersfield, in the county of York, England, have invented certain new and useful Improvements in Employees' Time-Recorders and Like Apparatus, of which the following is a specification.

This invention has reference to employees' time-recorders and like apparatus in which by turning a hand-lever or pointer around a dial or face plate to any desired number thereon indicating the person who desires to make a record and then actuating certain mechanism the time of entrance or departure of the employee or of the commencement or completion of a piece of work will be recorded by means of clockwork-driven type-wheels on the recording stripor sheet opposite the number assigned to the employee.

The objects of my invention in the above type of time-recorders are to provide on or in conjunction with the dial or face plate improved means for more easily centering or guiding and correctly positioning the pointer or pin or actuating lever or finger or fingers thereon opposite any desired number on the dial, to apply improved means to the lever-arm or pointer for actuating the hammer-trip device, and to so arrange and construct certain of the parts of the recording apparatus that each record when made may be exhibited at the front of the case or dial.

In the accompanying drawings, forming a part of this specification, Figure 1 is a front elevation of an employee's time-recorder embodying my improvements. Fig. 2 is an enlarged front elevation of the dial and parts, showing clearly my improvements. Fig. 3 is a sectional plan view of the recorder-casing, showing the parts illustrated in Fig. 2. Fig. 4 is an elevation of a dial-plate, showing a modification of my invention, having two concentric circles of numbers, with centering depressions to each. Fig. 5 is a sectional plan of same and compound lever employed. Fig. 6 shows a modification of the means for actuating the hammer trip device. Figs. 7 and 8 are sections of a portion of the dial-plate, showing the preferred form of depressions which may be adopted, with means for insuring centering of the pointer before the record can be made. Fig. 9 is a perspective view of the skeleton drum or cylinder for carrying the recording-strip, and Fig. 10 shows a fragment of the recording-strip detached and on a larger scale.

Referring to the drawings, letter $a$ represents the casing, containing a clock $b$, which is coupled by a flexible shaft in the usual way to mechanism (not shown) for actuating the type-wheels $c$, the rotation of the minute and hour type-wheels $c$ being common to work people's time-recorders.

The first part of my invention refers to the dial-plate $d$ and to an improved construction of the said dial-plate whereby the pointer or pin $e$, by which the required number of the workman is indicated and the corresponding number on the record-strip brought opposite the type-wheels, is more easily centered or guided or correctly positioned relatively to the desired number. This part of my invention consists in forming or applying around the outer edge of the dial $d$, which is made without openings or perforations therethrough, a series of V or diamond or similar suitably-shaped projections $f$, having corresponding recesses or depressions $f'$ between them, or the said shaped projections may extend radially beyond the edge of the dial. Each depression $f'$ is opposite a number printed, impressed, or otherwise affixed on the dial, as illustrated in Figs. 1 and 2, the numbers being arranged in progressive order from "1" up to any desired number in a circle or circles concentric with the axis of the dial or disk. The said numbers are arranged in sections of, say, ten or other number fixed upon, and between the last and first sections, or the highest and lowest numerals, there is a stop-piece $f'''$ to prevent more than a single revolution of the lever or pointer.

The lever-arm or swaife $g$, to carry the pointer $e$, is made of suitable hollow section with a boss $g'$, as usual, to fit upon the ordinary hollow shaft $h$, which has mounted thereon a bevel or miter wheel $h'$, gearing with a bevel or miter wheel $i'$, fast on a shaft $i$, supported in bearings $i''$, and through which said gears motion is conveyed from the hollow shaft $h$ to the drum or cylinder $k$, carrying the recording-strip of paper $l$ in order to rotate said drum to bring the numeral marked at the edge of the recording-strip thereon corresponding to the numeral on the dial-plate opposite to which the pointer is moved and depressed onto the printing-line. The drum or cylinder $k$ is secured rotatively to the shaft $i$, but in this instance is free to be slid endwise along said shaft to bring any desired marked-off space or section on the paper strip *l* opposite the printing type-wheels *c*.

In the hollow arm or lever *g*, at each end thereof, are bell-crank or angle levers *m n*, mounted, respectively, on studs *m' n'*, secured to the lever-arm *g*. One arm of each of said levers are connected together by a link or rod *o*, and to the other arm of the lever *m* is attached one end of a flexible wire cord *p* or a length of stout wire, which is passed through the hollow shaft *h* and its opposite end secured to a double-armed lever *q*, to whose opposite arm is connected a rod or finger *q'*, supported in a horizontal plane by any suitable bearing or platform and having a hook or projection *q''* at its free end which is adapted to engage with and trip a hammer *r*, pivoted at *r'* on a stand or bracket *r''*. The angle-lever *n* at the outer end of the hollow arm *g* has one member thereof extending outward some distance beyond the end of the said arm and provided with a suitable knob or handle *n''* and also with an extension *n'''*, projecting inwardly toward the dial-plate and passing through and being guided in an opening *g''* in the arm *g*, the extremity of said extension being suitably shaped to register in the V-shaped recesses or depressions *f'* on the dial-plate and comprising the pointer or pin *e*. The movement of the handle or arm *g* around the dial-plate rotates the hollow shaft *h* and through bevel-gears *h'* and *i'* gives a proportionate rotation to the shaft *i* and drum *k* to bring the number on the paper record-strip *l* corresponding to that opposite the space *f'*, to which the pointer has been moved, into alinement with or on the same horizontal plane as the hammer *r*, and when the pointer or pin is brought opposite the recess coinciding with the number required the employee presses the knob *n''* toward the dial-plate, whereby the pointer *e* by means of the converging sides of the depressions or V-shaped recesses is caused to center itself accurately in the proper recess. The same inward pressure upon the handle or knob *n''* through link *o*, bell-crank lever *m*, wire connection *p*, and lever *q* causes the rod or finger *q'* to be drawn sharply in the direction of the arrow, Fig. 3, whereby the hammer is moved on its pivot center away from the paper record-strip against the pressure of a spring *s*, and when the hook or catch *q''* at the free end of the rod or finger *q'* passes clear of the correspondingly-shaped end of the hammer the spring forces the latter back, and by a percussive blow said hammer strikes the paper strip against the ink-ribbon (not shown) and type-wheels, whereby the hour and the minute or second or fraction of a minute or second are printed on the paper recording-strip opposite the number thereon corresponding to the number on the dial to which the pointer or pin *e* has been moved. A spiral spring *s'* holds the hammer-actuating rod *q'* in engagement with the end of the hammer and admits of the hooked end riding over same on its return movement after each actuation.

The ink-ribbon is traversed between the recording-strip and the type-wheels by any known mechanism.

When it is required to use a larger number of numerals and it is not desirable to increase the size of the dial-plate or to decrease the space between the centering depressions, I construct the machine with a dial-plate, as shown at Fig. 4, there being, say, an outer circle containing odd numbers and an inner circle containing the even numbers, the lowest of which commences diametrically opposite the numeral "1" in the outer circle, the numbers in the outer circle being arranged progressively from right to left and those on the inner circle from left to right. There are two concentric circles of centering depressions *f'*, these being made between the two circles of numerals, as shown, or alternate of the circles of numerals, or one set on the outside of the outer circle of numerals and the other set within the inner circle of numerals, respectively, as may be preferred. The actuating-lever *q* is in such case a double-armed lever having a pointer or pin *e* at each end, one being opposite the inner circle of depressions *f'* and the other opposite the outer circle of centering depressions. In order that the depression of either pointer shall actuate the hammer trip motion without affecting the other pointer, the connecting-links coupling each pair of angle-levers *m n* together are slotted, as at *o'*, whereby when the levers *m n* and connecting-link in one arm of the lever are actuated the inner lever *m* in the other arm can move on its pivot center without actuating the outer angle-lever in said arm. The two angle-levers *m* are pivotally connected together and the cord *p* connected with both levers. Springs *e'* are confined on the pointers *e* to maintain them in normal position. The two circles of numerals and the two arms of the compound lever may be painted in contrasting colors to avoid error in using the proper pointer. More than two circles of numerals and centering depressions may be emlpoyed, if necessary, additional arms and pointers being provided in conjunction with same.

In lieu of the inner bell-crank levers *m* and connecting-links *o* motion may be transmitted from the lever *n*, carrying the pointer, direct to the lever for actuating the hammer trip device by means of a flexible wire cord *o''* or chain, connected to the lever *n* or to a pulley *o'''*, taking the place of the lever *n*, and to which the arm carrying the pointer is secured and guided around a pulley located in a central position to guide the cord or wire direct to the trip motion, as illustrated at Fig. 6. Such alternative arrangements may be duplicated for a double arm and a light spring provided to take up the slack of the cord.

I preferably provide a countersunk recess, opening, or channel at the bottom of each V or equivalent-shaped centering-recess $f'$, as indicated at $f''''$ in Fig. 7, and form a nose on the pointer to enter said small recess, so that the hammer trip-motion cannot be actuated until the pointer has entered the V or similar shaped recess $f''$ to such an extent as to be accurately centered therein—that is to say, the nose of the pointer must enter the recess or channel $f''''$ before the actual printing takes place, whereby the corresponding number on the recording-strip will be accurately alined for receiving the impression before the hammer strikes the blow.

Instead of V or similar angular-shaped projections and corresponding recesses circular or like openings or recesses may be made, as illustrated at Fig. 8, these having flaring mouths $f''''$ and converging on all sides to a small central opening $f'''$.

A hole or opening $a'$ with glass let into same is left in the front of the case to expose the record-strip to view, so that the impressions made thereon can be examined at any time from the outside.

The dial-plate having V-shaped recesses opposite each number thereon for facilitating the centering of the pointer may be used in any other arrangement or make of dial and pointer machine.

My invention further consists in making the impression on the surface of the paper secured on the drum or cylinder $k$ by a hammer-blow from the inside of the drum, and for this purpose I employ a skeleton drum or cylinder comprising end portions $k'$ $k''$ and connecting cross bars or ribs $k'''$, spaced at equal distances apart, somewhat as shown at Fig. 9, the space occupied by each cross-bar corresponding in position to the divisions $d'$ between each section of numerals on the dial $d$. The paper strip is passed around and its opposing ends secured by any suitable known means to the cylinder $k$, so as to rotate therewith. The said skeleton cylinder is employed in order that the hammer $r$ may be located within the cylinder to strike against the rear face of the paper recording-strip and cause the impression of the type presented by the type-wheels to be made on the outer face of the paper to give a better impression than is produced by the pressure of the cylinder against the type-wheels, or conversely. For the purpose of bringing the various sections into which the recording-strip is divided laterally opposite the striking-surface of the hammer and the type-wheels I have devised means for moving the drum or cylinder $k$ longitudinally on its shaft instead of sliding the carriage or frame carrying the type-wheels and the hammer laterally, as I find this to be the more convenient arrangement. To move the cylinder $k$ longitudinally to present the desired section of paper opposite the type-wheels, I employ a lever $t$, fast on a stud $t'$, supported in bearings in the casing and projecting through said casing to the interior thereof, and on the inner end of which is secured a second lever $t''$, carrying at its free end a stud or pin $t'''$, which enters and engages a slot in a projection $u'$ on one end of a longitudinal sliding bar or rod $u$, supported in bearings or brackets $u''$, secured to the wall of the casing. To the opposite end of said bar or rod $u$ is hinged a finger $v$, which extends into an annular groove or recess in the boss of the drum or cylinder $k$ and engages with the sides thereof. The free end of the lever $t$ forms a pointer and is adapted to be moved over a scale or indicator $w$, which is marked with the times or periods during a working day at which it is required the work people shall register on entering and leaving the premises, and in setting the pointer opposite any of the marked spaces on the indicator $w$ the drum $k$ through levers $t$ $t''$ rod $u$, and finger $v$ is moved longitudinally on its axis to bring the corresponding section marked on the recording-strip opposite the type-wheels, as will be clearly seen from the drawings. The recording-strip is so marked that opposite each cross-bar on the cylinder there is a blank space on which no record can be made, and such spaces correspond to the spaces left between each section of numerals on the dial.

The outer end of the shaft $i$ is mounted in a bearing in the hinged arm or stand $x$, which is adapted when the door $y$ is opened to be swung outwardly clear of the shaft $i$ in order that by elevating the finger V clear of the drum the latter can be readily withdrawn from the casing to admit of the record-strip being removed and another one attached in its place.

Having thus described my invention, what I claim as new, and desire to secure by Letters Patent, is—

1. In a time-recorder, a dial, a series of numbers and recesses therein, said recesses having countersunk portions, an arm adapted to traverse said dial, a rotatable drum, means intermediate said drum and said arm, whereby, upon the movement of said arm, the said drum is rotated, printing devices, a lever mounted in the aforesaid arm and adapted to operate the said printing devices, a centering-pin adapted to enter the countersinks in the recsses whereby the lever for actuating the printing devices may be operated only after the centering-pin has entered a countersink in one of the recesses, thus positively centering the lever opposite the correct number.

2. In a time-recorder, a dial having two or more circles of numerals, and recesses or depressions, which recesses do not extend through the dial, a swinging arm carrying two pointers, a rotary cylinder carrying a recording-strip, and connections intermediate said cylinder and said swinging arm, to rotate said cylinder through the movement of said swinging arm, type-wheels, a hammer within said cylinder, connections intermediate said hammer and each of said pointers, to actuate said hammer by the inward movement of either pointer, substantially as shown and described.

3. In a time-recorder, a skeleton drum or cylinder movable longitudinally of its axis and carrying a recording-strip on its periphery, a hammer located within said cylinder, and adapted to strike against the inner surface of the recording-strip, to press the strip against the type-wheels, means for rotating the cylinder and means for moving the cylinder longitudinally of its axis, said latter means comprising a grooved hub on the cylinder, a lever having a pointer at one end adapted to traverse the face of an index-card and suitable connections between said grooved hub and said lever whereby the longitudinal movement of the cylinder may be indicated.

4. In a time-recorder, a skeleton drum or cylinder movable longitudinally of its axis and carrying a recording-strip on its periphery, a hammer located within said drum and adapted to strike against the inner surface of said recording-strip to thereby force the same against the type-wheels, means for rotating said cylinder and means for moving said cylinder longitudinally of its axis, said latter means comprising a grooved hub on the cylinder adapted to receive one end of a pivotally-mounted arm, the opposite end of said arm being pivotally mounted in a reciprocating rod whereby the drum may be engaged or disengaged at will and when so engaged moved longitudinally in either direction as desired.

5. In a time-recorder, a dial, a series of numbers and recesses thereon, an arm carrying a pointer and movable about the dial, a skeleton drum having longitudinal strips carrying a recording-blank thereon and means actuated by the arm for rotating the drum, said dial having a series of blank spaces or portions unprovided with numbers or recesses corresponding to the longitudinal strips of the drum, whereby such longitudinal strips are not brought opposite the printing instrumentalities.

6. In a time-recorder, a dial, a series of numbers and recesses thereon, an arm carrying a pointer and movable about the dial, a drum having a recording-strip thereon, means actuated by the arm for rotating the drum, a shaft on which said drum is longitudinally movable, a pivotally-mounted swinging bracket in which one end of said shaft is journaled, means comprising a grooved hub on the drum and a coöperating pivotally-mounted reciprocating arm, whereby said drum may be moved longitudinally upon the said shaft, the aforesaid pivotally-mounted swinging bracket and pivotally-mounted reciprocating arm both being adapted to swing clear of the path of the drum, as said drum is withdrawn from its shaft.

In testimony whereof I affix my signature in presence of two witnesses.

FRANK BROOK.

Witnesses:
 THOMAS H. BARRON,
 ERNEST HUSTWICK.